3,412,073
PROCESS FOR POLYMERIZING PIVALOLACTONE
Milton Jones Hogsed, Kinston, N.C., assignor to E. I. du Pont de Nemours and Company, Wilmington, Del., a corporation of Delaware
No Drawing. Filed Dec. 28, 1965, Ser. No. 517,078
1 Claim. (Cl. 260—78.3)

This invention relates to a process for preparing polymeric 2,2-disubstituted 3-propiolactones. More particularly, the invention relates to the use of a novel class of initiators for the preparation of the polymeric lactones.

Pivalolactone and other 2,2-disubstituted 3-propiolactones polymerize to form polyesters which can be extruded to form fibers valuable for the production of many textile materials. In particular, the fibers have been found superior to fibers of polyethylene terephthalate and other conventional polyesters for garments which can be laundered after they have been worn, dried quickly, and present a good appearance when worn again without any ironing being required.

Although the 2,2-disubstituted 3-propiolactones can be polymerized without the aid of a catalyst, this is accomplished only with difficulty. Unfortunately, materials such as antimony oxide, arsenic oxide, and tetrabutyl titanate usually employed as catalysts for preparing polyethylene terephthalate and other conventional polyesters are ineffective for preparing polyesters from the 2,2-disubstituted 3-propiolactones.

In accordance with the present invention, it has been found that tertiary stibines of the formula $$RR'R''Sb$$

wherein R, R', and R'' are the same or different alkyl or aralkyl radicals containing from one to twelve carbon atoms, are excellent initiators for the polymerization of 2,2-disubstituted 3-propiolactones.

More specifically described, the invention comprehends a novel process in which a 2,2-disubstituted 3-propiolactone having the formula.

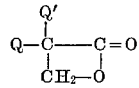

wherein Q and Q' are the same or different alkyl radicals containing from 1 to 4 carbon atoms which may contain chlorine substituents and which may optionally be joined by a carbon-to-carbon bond to form an alicyclic ring, is mixed with an antimony compound of the formula RR'R''Sb, wherein R, R', and R'' have the values defined above; and the mixture is heated at a temperature in the range of about 50° to about 300° C. until the mixture has polymerized to form a polymeric 2,2-disubstituted 3-propiolactone. The amount of antimony compound added is preferably in the range of about 0.001 to about 2 mols per hundred mols of lactone to be polymerized.

The reaction may be carried out simply by mixing the lactone and the tertiary stibine and heating the mixture to a temperature of at least about 50° C. until the mixture has polymerized. Elevation of the reaction temperature above the temperature at which heat is applied externally may occur owing to spontaneous evolution of heat.

Typical tertiary stibines which may be employed in accordance with the present invention include tributylstibine, trimethylstibine, triethylstibine, triamylstibine, tridecylstibine, tridodecylstibine, dimethylethylstibine, dimethylbutylstibine, methyldiethylstibine, methyldibutylstibine, and tribenzylstibine.

However, in accordance with the present invention, it has been found that the triarylstibines are not effective initiators for the polymerization of 2,2-disubstituted 3-propiolactones, and they are not intended to be comprehended within the scope of suitable initiators.

Typical 2,2-disubstituted 3-propiolactones which may be employed in accordance with the present invention include pivalolactone (Q=Q'=CH$_3$), 2,2-diethyl-3-propiolactone (Q=Q'=CH$_2$CH$_3$), 2-methyl-2-chloromethyl-3-propiolactone (Q=CH$_3$, Q'=ClCH$_2$), 2,2-bis(chloromethyl)-3-propiolactone (Q=Q'=ClCH$_2$), 2-methyl-2-ethyl-3-propiolactone (Q=CH$_3$, Q'=CH$_2$CH$_3$), 2,2-dipropyl-3-propiolactone (Q=Q'=CH$_2$CH$_2$CH$_3$), 2,2-dibutyl-3-propiolactone (Q=Q'=CH$_2$CH$_2$CH$_2$CH$_3$), and 2,2-pentamethylene-3-propiolactone $$(Q=Q'—CH_2CH_2CH_2CH_2CH_2)$$

Copolymeric components may also be added, including ester-forming monomers such as carbonates, other lactones, and unsaturated compounds such as methyl vinyl sulfone. Preferably, at least 50% of the material to be polymerized comprises the 2,2-disubstituted 3-propiolactone, both on a mol percentage and weight percentage basis.

Although the homopolymer prepared by the polymerization of pivalolactone is designated herein simply as polypivalolactone, the polymer can also be named by such alternative names as poly(oxycarbonyl-1,1-dimethyldimethylene), multi(oxycarbonyl - 1,1 - dimethyldimethylene), and poly(hydroxypivalic acid). Similarly, the polymer obtained from 2-chloromethyl-2-methyl-3-propiolactone may be designated as poly(2-chloromethyl-2-methyl-3-propiolactone), as poly(oxycarbonyl-1-chloromethyl-1-methyldimethylene), or by various other alternative names.

The following example will further illustrate the invention, although it is intended as limitative.

The term "inherent viscosity," as used herein, is defined as the polymer property determined in accordance with the following relationship:

$$\eta_{inh} = \frac{\ln \eta_{rel}}{c}$$

wherein the relative viscosity, $\eta_{rel}$, is calculated by dividing the flow time in a capillary viscometer of a dilute solution of the polymer by the flow time for the pure solvent, trifluoroacetic acid. The concentration (c) used in the examples is 0.5 gram of polymer per 100 ml. of solution and a temperature of 25° C. is employed. It is desirable that the polymer have an inherent viscosity of at least about 0.5 for preparation of films. For the production of fibers an inherent viscosity of at least about 0.75 is desirable.

Example

To 25 ml. (24.5 g., 0.245 mol) of pivalolactone in a glass tube is added 0.20 ml. of a 1 molar solution of tributylstibine in benzene. The mixture is heated in a bath maintained at 95° C. The temperature of the mixture continues to increase spontaneously. After 5 minutes, the mixture beings to boil and it is then removed from the bath. The product, polypivalolactone, is obtained in virtually quantitative yield. It has an inherent viscosity of 0.82 and is readily melt spun to form tenacious fibers. Films melt pressed from the polymer are tough and flexible.

Similar results are obtained by replacing the tributylstibine solution in the above procedure with 0.20 ml. quantities of 1 molar solutions of triamylstibine or tribenzylstibine.

In a control experiment, 0.035 g. of triphenylstibine is substituted for the tributylstibine solution in the above procedure. However, the product resulting from the experiment is of low molecular weight, having an inherent viscosity of only 0.25.

In a series of three additional control experiments, 0.2 g. quantities of antimony trioxide, arsenic trioxide, and tetrabutyl titanate are substituted for the tributylstibine solution in the above procedure. In each case the mixture of pivalolactone and additive is heated for one hour in the bath at 90° C. However, the mixtures do not boil or solidify and separation of polymer is not observed.

In still another control experiment, pivalolactone, containing no additive is heated on a steam bath overnight. The liquid in the tube at the conclusion of this treatment is found to be unreacted pivalolactone containing about 2% by weight of polypivalolactone in suspension.

Similarly, poly(2,2-diethyl-3-propiolactone) is prepared by replacing the pivalolactone in the above example with an equivalent amount of 2,2-diethyl-3-propiolactone; and poly(2-chloromethyl-2-methy-3-propiolactone) is prepared by replacing the pivalolactone in the above example with an equivalent amount of 2-chloromethyl-2-methyl-3-propiolactone.

What is claimed is:

1. A process for polymerizing pivalolactone comprising mixing said lactone with tribenzylstibine and heating the mixture at a temperature in the range of about 50° to about 300° C. until polypivalolactone is formed.

References Cited

UNITED STATES PATENTS 3,268,486   8/1966   Klootwijk _____ 260—78.3

WILLIAM H. SHORT, *Primary Examiner.*

R. T. LYON, *Assistant Examiner.*